US012039965B2

(12) United States Patent
Yamanashi et al.

(10) Patent No.: US 12,039,965 B2
(45) Date of Patent: Jul. 16, 2024

(54) AUDIO PROCESSING SYSTEM AND AUDIO PROCESSING DEVICE

(71) Applicant: Panasonic Intellectual Property Management Co., Ltd., Osaka (JP)

(72) Inventors: Tomofumi Yamanashi, Kanagawa (JP); Yutaka Banba, Kanagawa (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 203 days.

(21) Appl. No.: 17/689,504

(22) Filed: Mar. 8, 2022

(65) Prior Publication Data
US 2022/0189450 A1 Jun. 16, 2022

Related U.S. Application Data

(63) Continuation of application No. PCT/JP2020/021794, filed on Jun. 2, 2020.

(30) Foreign Application Priority Data

Sep. 30, 2019 (JP) .................. 2019-180180

(51) Int. Cl.
*H04R 1/00* (2006.01)
*G10K 11/178* (2006.01)
*H04S 7/00* (2006.01)

(52) U.S. Cl.
CPC .. *G10K 11/17854* (2018.01); *G10K 11/17857* (2018.01); *G10K 11/17881* (2018.01);
(Continued)

(58) Field of Classification Search
CPC ...................... H04R 2499/13; G10K 2210/108
(Continued)

(56) References Cited

U.S. PATENT DOCUMENTS 8,130,941 B2  3/2012 Taniguchi et al.
8,644,494 B2  2/2014 Taniguchi et al.
(Continued)

FOREIGN PATENT DOCUMENTS

JP         6-269083 A    9/1994
JP    2001-013972 A    1/2001
(Continued)

*Primary Examiner* — Katherine A Faley
(74) *Attorney, Agent, or Firm* — Seed IP Law Group LLP

(57) ABSTRACT

An audio processing system includes: a first microphone configured to output a first signal based on a first audio signal; one or more microphones each of which outputs a microphone signal based on an audio signal; one or more adaptive filters configured to respectively receive the microphone signals from the one or more microphones and output passing signals based on the microphone signals; and a processor configured to: determine whether the microphone signal includes uncorrelated noise; control one or more filter coefficients of the one or more adaptive filters; and subtract a subtraction signal based on the passing signals from the first signal. The one or more microphones include a second microphone that outputs a second signal. When determining that the second signal includes the uncorrelated noise, the processor is configured to set a level of the second signal input to the corresponding adaptive filter to zero.

20 Claims, 7 Drawing Sheets

(52) U.S. Cl.
CPC ........ *G10K 11/17885* (2018.01); *H04S 7/302* (2013.01); *G10K 2210/108* (2013.01); *G10K 2210/1282* (2013.01); *G10K 2210/3046* (2013.01); *H04R 2499/13* (2013.01)

(58) Field of Classification Search
USPC ......................................................... 381/86
See application file for complete search history.

(56) References Cited

U.S. PATENT DOCUMENTS

| | | | |
|---|---|---|---|
| 8,644,495 B2 | 2/2014 | Taniguchi et al. | |
| 9,805,734 B2 | 10/2017 | Sugiyama | |
| 9,912,358 B2* | 3/2018 | Pratt | H04B 1/1018 |
| 2005/0213778 A1* | 9/2005 | Buck | H04R 29/005 381/94.1 |
| 2011/0135126 A1* | 6/2011 | Gozen | H04R 25/505 381/313 |
| 2013/0156208 A1* | 6/2013 | Banba | G10L 21/0208 381/60 |
| 2013/0191119 A1* | 7/2013 | Sugiyama | H04B 3/23 704/226 |

FOREIGN PATENT DOCUMENTS

| | | |
|---|---|---|
| JP | 4889810 B2 | 3/2012 |
| JP | 6363324 B2 | 9/2018 |

* cited by examiner

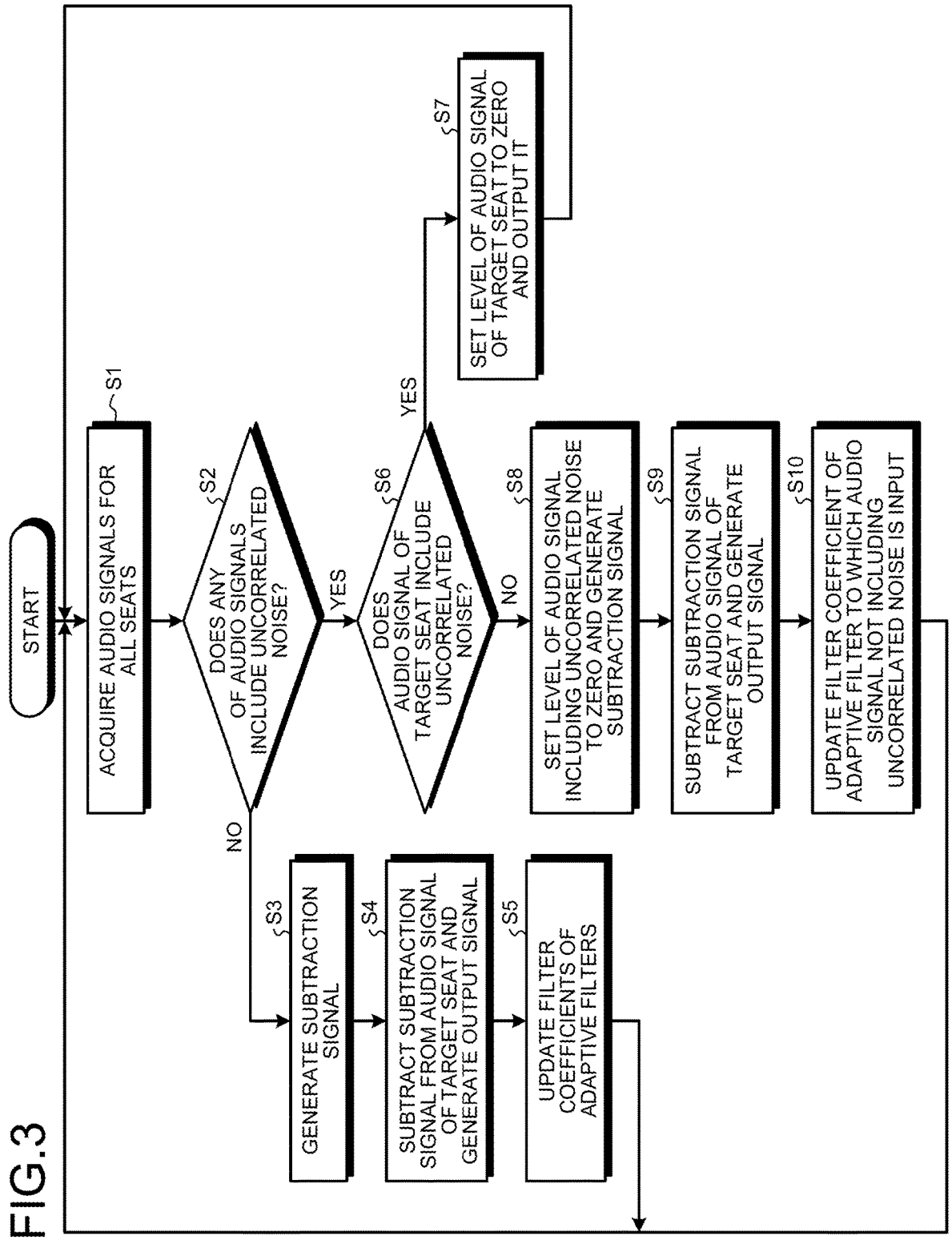

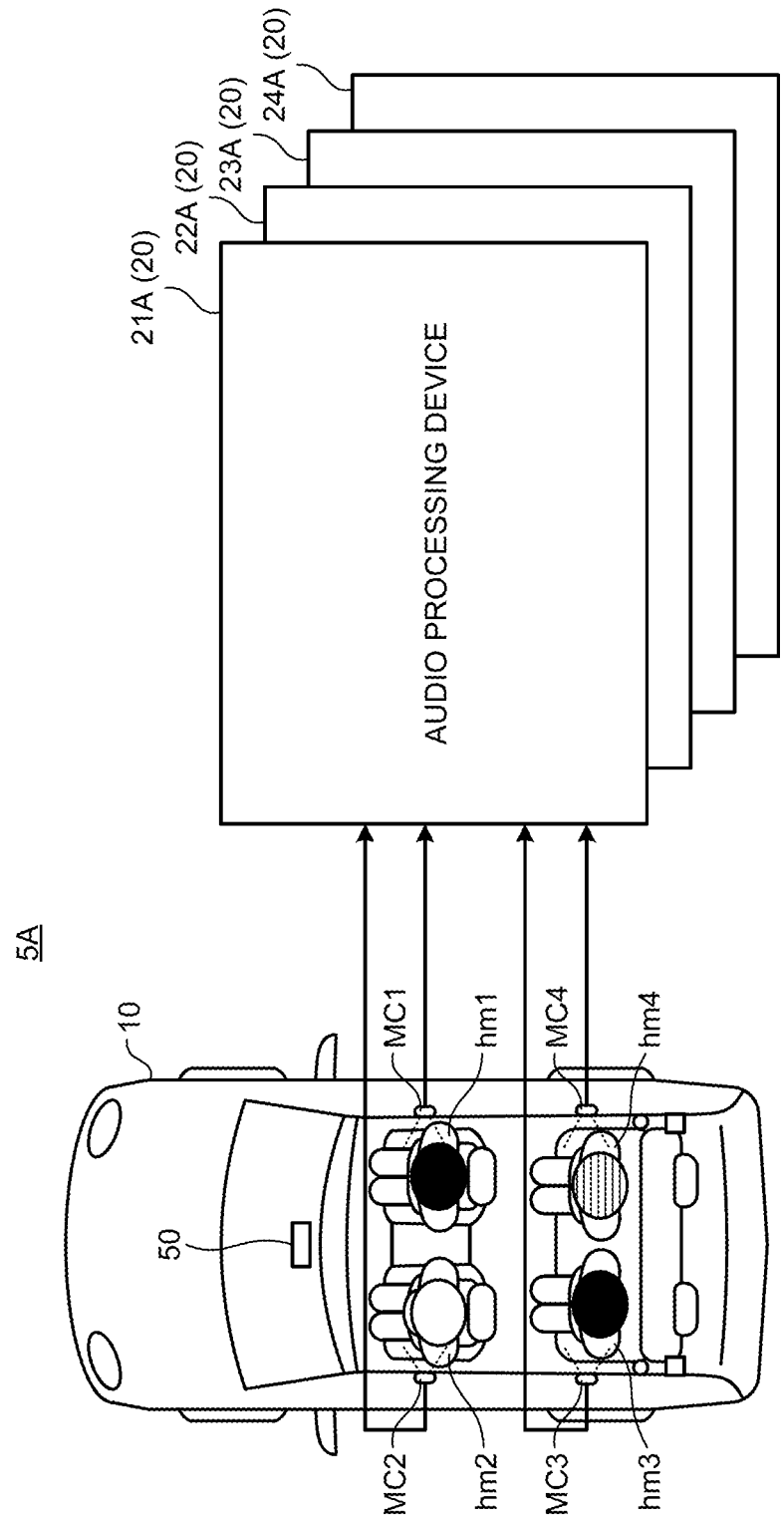

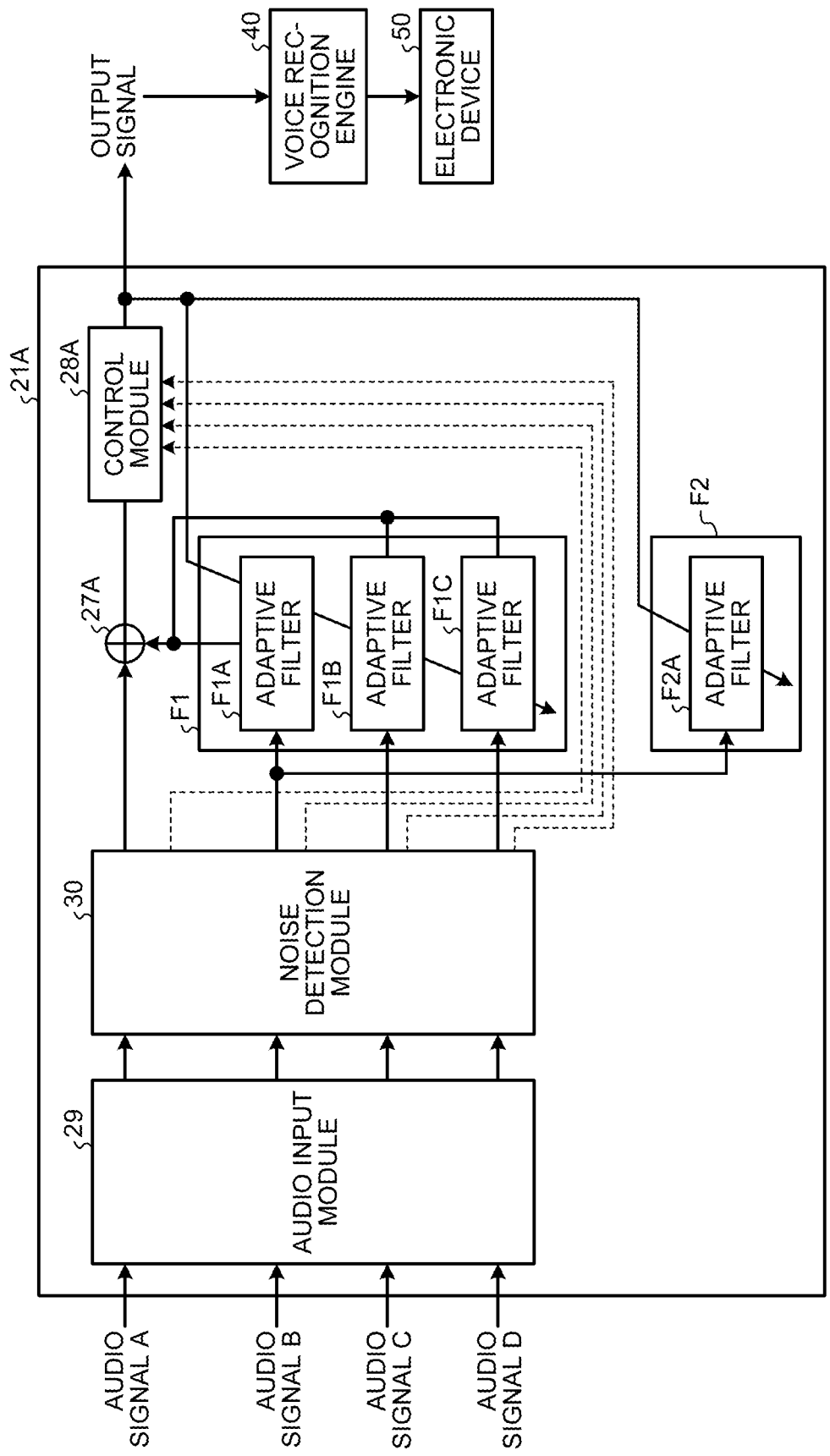

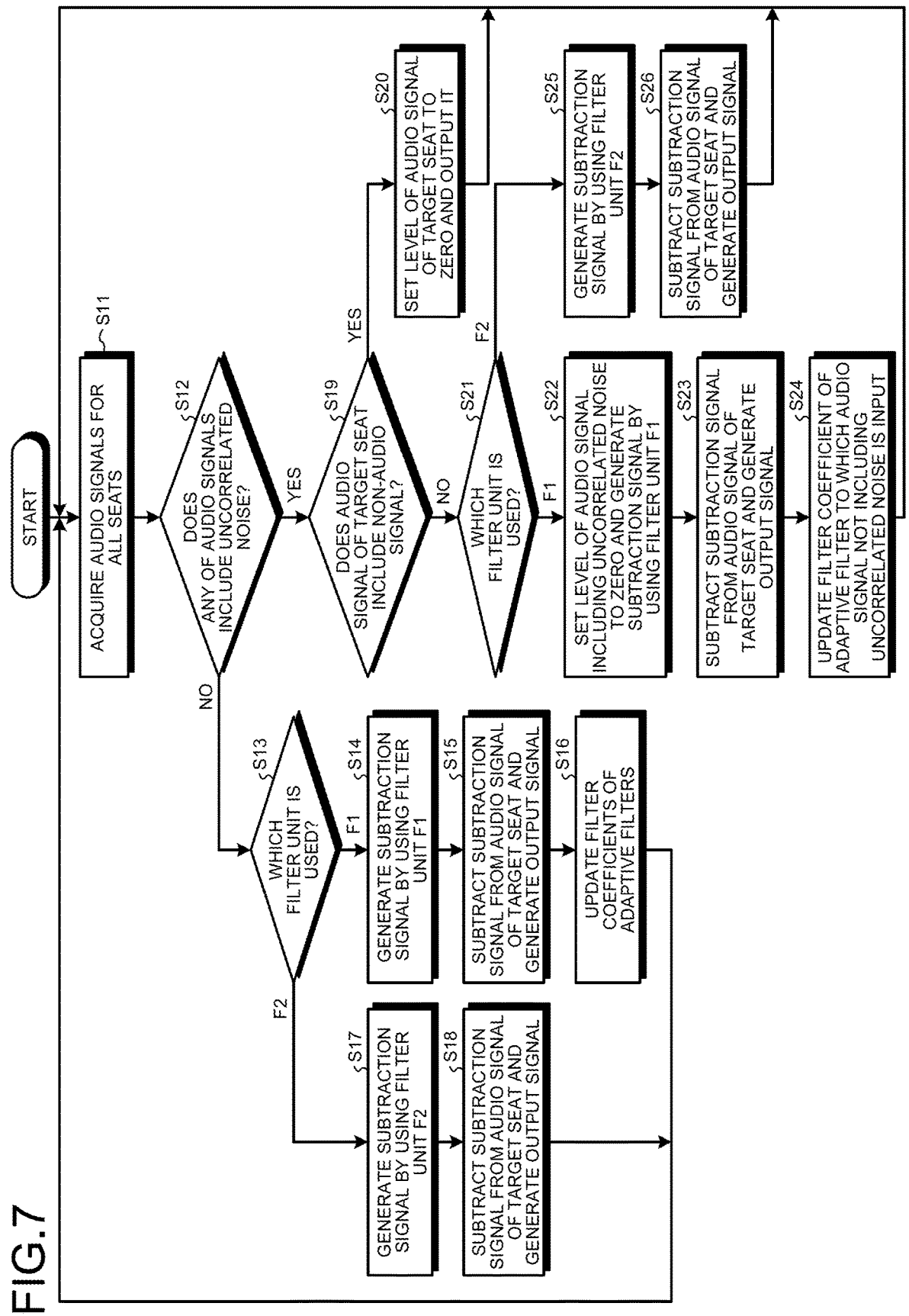

AUDIO PROCESSING SYSTEM AND AUDIO PROCESSING DEVICE

CROSS-REFERENCE TO RELATED APPLICATIONS

This application is a continuation of International Application No. PCT/2020/021794, filed on Jun. 2, 2020 which claims the benefit of priority from Japanese Patent Application No. 2019-180180, filed on Sep. 30, 2019, the entire contents of which are incorporated herein by reference.

FIELD

Embodiments described herein relate generally to an audio processing system and an audio processing device.

BACKGROUND

In a vehicle-mounted voice recognition device and a hands-free call, an echo canceller for removing surrounding audio to recognize only the audio of a speaker has been known. Japanese Patent No. 4889810 discloses an echo canceller that switches the number of operating adaptive filters and the number of taps according to the number of sound sources.

When echo cancellation is performed using adaptive filters, surrounding audio is input to the adaptive filters as a reference signal. Even when the surrounding audio includes uncorrelated noise, it is beneficial to remove the surrounding audio to obtain the target audio.

The present disclosure provides an audio processing system capable of obtaining a target audio with high accuracy even when surrounding audio includes uncorrelated noise.

SUMMARY

An audio processing system according to an embodiment of the present disclosure includes a first microphone, one or more microphones, one or more adaptive filters, and a processor. The first microphone is configured to acquire a first audio signal including a first audio component and output a first signal based on the first audio signal. Each of the one or more microphones is configured to acquire an audio signal including an audio component different from the first audio component and output a microphone signal based on the audio signal. The one or more adaptive filters are configured to respectively receive the microphone signals from the one or more microphones and output passing signals based on the microphone signals. The processor is configured to: determine whether each of the microphone signals includes uncorrelated noise that is noise having no correlation between the audio signals; control one or more filter coefficients of the one or more adaptive filters; and subtract a subtraction signal based on the passing signals from the first signal. The one or more microphones include a second microphone configured to acquire a second audio signal including a second audio component different from the first audio component and output a second signal based on the second audio signal. When determining that the second signal includes the uncorrelated noise, the processor is configured to set a level of the second signal input to the corresponding adaptive filter to zero.

BRIEF DESCRIPTION OF DRAWINGS

FIG. 3 is a flowchart illustrating an operation procedure of the audio processing device according to the first embodiment;

FIG. 5 is a diagram illustrating an example of a schematic configuration of an audio processing system according to a second embodiment;

FIG. 6 is a block diagram illustrating a configuration of an audio processing device according to the second embodiment; and FIG. 7 is a flowchart illustrating an operation procedure of the audio processing device according to the second embodiment.

DETAILED DESCRIPTION

Knowledge underlying the present disclosure

In a case where the surrounding audio includes uncorrelated noise, it may be difficult to remove the surrounding audio and obtain a target audio even if echo cancellation is performed using the surrounding audio.

Hereinafter, embodiments of the present disclosure will be described in detail with reference to the drawings as appropriate. However, unnecessarily detailed description may be omitted. Note that the accompanying drawings and the following description are provided for those skilled in the art to fully understand the present disclosure, and are not intended to limit the subject matter described in the claims.

First Embodiment

Figure 1:
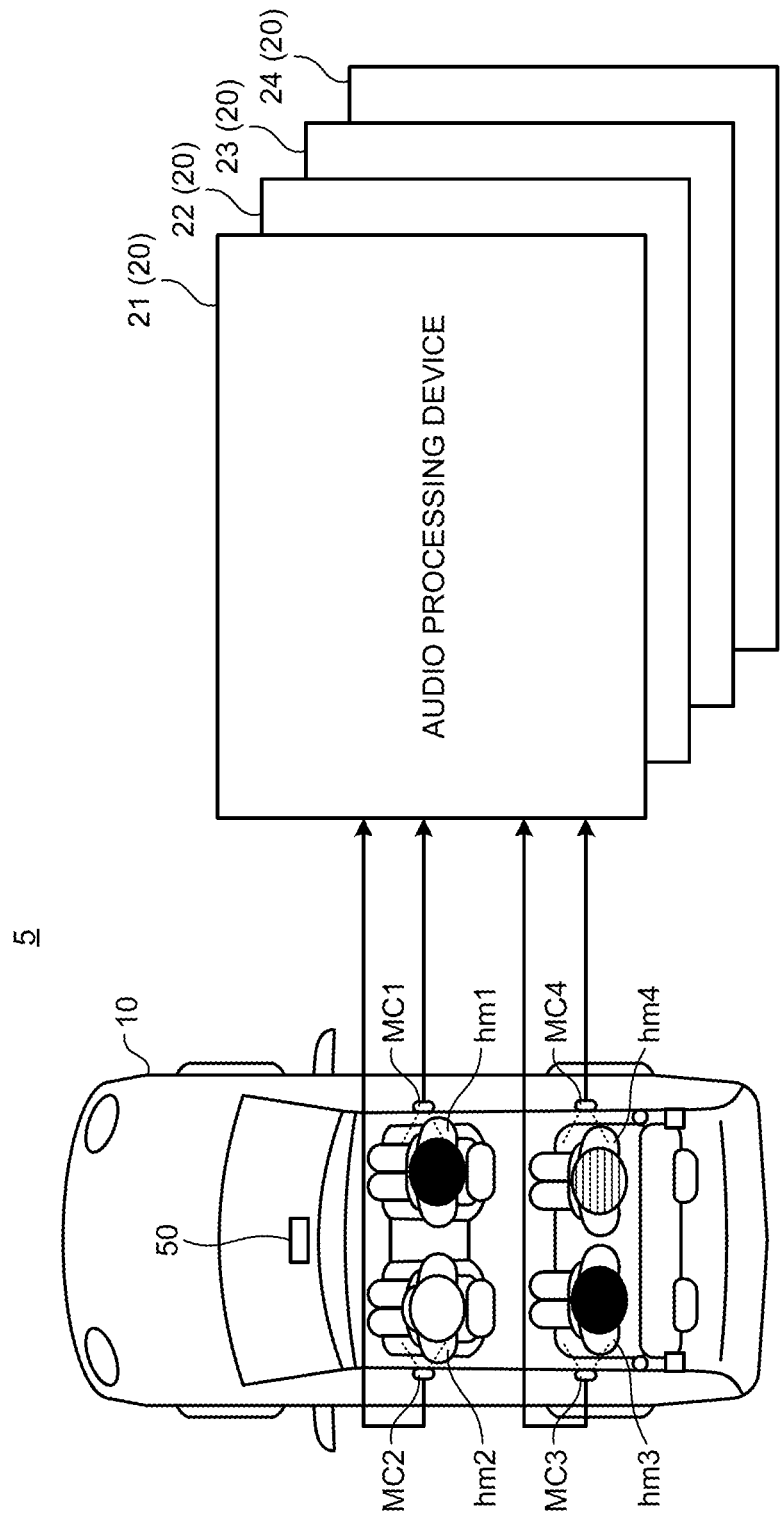
FIG. 1 is a diagram illustrating an example of a schematic configuration of an audio processing system according to a first embodiment.

FIG. 1 is a diagram illustrating an example of a schematic configuration of an audio processing system 5 according to a first embodiment. The audio processing system 5 is mounted on a vehicle 10, for example. Hereinafter, an example in which the audio processing system 5 is mounted on the vehicle 10 will be described. A plurality of seats is provided in the cabin of the vehicle 10. The plurality of seats is, for example, four seats including a driver's seat, a passenger seat, and left and right rear seats. The number of seats is not limited to this. The audio processing system 5 includes a microphone MC1, a microphone MC2, a microphone MC3, a microphone MC4, and an audio processing device 20. In this example, the number of seats matches the number of microphones, but the number of microphones may not match the number of seats. The output of the audio processing device 20 is input to a voice recognition engine (not illustrated). The voice recognition result by the voice recognition engine is input to an electronic device 50.

The microphone MC1 collects the audio uttered by a driver hm1. In other words, the microphone MC1 acquires an audio signal including the audio component uttered by the driver hm1. The microphone MC1 is disposed, for example, on an assist grip on the right side of the driver's seat. The microphone MC2 collects the audio uttered by an occupant hm2. In other words, the microphone MC2 acquires an audio signal including the audio component uttered by the occupant hm2. The microphone MC2 is disposed, for example, on an assist grip on the left side of the passenger seat. The microphone MC3 collects the audio uttered by an occupant hm3. In other words, the microphone MC3 acquires an audio signal including the audio component uttered by the occupant hm3. The microphone MC3 is disposed, for example, on an assist grip on the left side of the rear seat. The microphone MC4 collects the audio uttered by an occupant hm4. In other words, the microphone MC4 acquires an audio signal including the audio component uttered by the occupant hm4. The microphone MC4 is disposed, for example, on the assist grip on the right side of the rear seat.

The disposition positions of the microphone MC1, the microphone MC2, the microphone MC3, and the microphone MC4 are not limited to the example described above. For example, the microphone MC1 may be disposed on the right front surface of the dashboard. The microphone MC2 may be disposed on the left front surface of the dashboard. The microphone MC3 may be disposed on the backrest portion of the passenger seat. The microphone MC4 may be disposed on the backrest portion of the driver's seat.

Each microphone may be a directional microphone or an omnidirectional microphone. Each microphone may be a small micro electro mechanical systems (MEMS) microphone or may be an electret condenser microphone (ECM). Each microphone may be a beam-formable microphone. For example, each microphone may be a microphone array having directivity in the direction of each seat and capable of collecting the audio of the directivity method.

In the present embodiment, the audio processing system 5 includes a plurality of audio processing devices 20 corresponding to the respective microphones. Specifically, the audio processing system 5 includes an audio processing device 21, an audio processing device 22, an audio processing device 23, and an audio processing device 24. The audio processing device 21 corresponds to the microphone MC1. The audio processing device 22 corresponds to the microphone MC2. The audio processing device 23 corresponds to the microphone MC3. The audio processing device 24 corresponds to the microphone MC4. Hereinafter, the audio processing device 21, the audio processing device 22, the audio processing device 23, and the audio processing device 24 may be collectively referred to as the audio processing device 20.

In the configuration illustrated in FIG. 1, the audio processing device 21, the audio processing device 22, the audio processing device 23, and the audio processing device 24 are each configured by different hardware, but the functions of the audio processing device 21, the audio processing device 22, the audio processing device 23, and the audio processing device 24 may be realized by one audio processing device 20. Alternatively, some of the audio processing device 21, the audio processing device 22, the audio processing device 23, and the audio processing device 24 may be configured by common hardware, and the others may be configured by different hardware.

In the present embodiment, each audio processing device 20 is disposed in each seat near each corresponding microphone. Each audio processing device 20 may be disposed in a dashboard.

Figure 2:
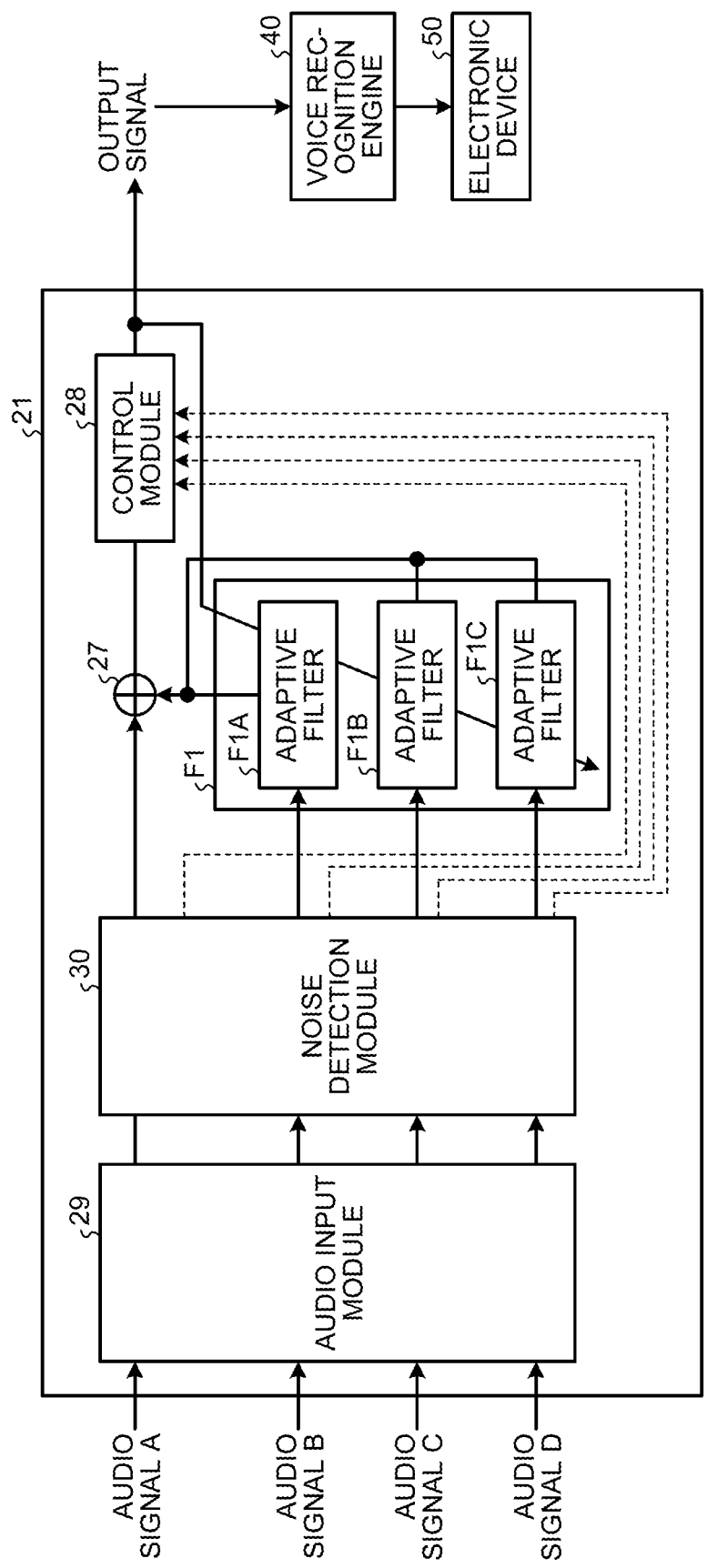
FIG. 2 is a block diagram illustrating a configuration of an audio processing device according to the first embodiment.

FIG. 2 is a block diagram illustrating a configuration of the audio processing system 5 and a configuration of the audio processing device 21. As illustrated in FIG. 2, the audio processing system 5 further includes a voice recognition engine 40 and the electronic device 50 in addition to the audio processing device 21, the audio processing device 22, the audio processing device 23, and the audio processing device 24. The output of the audio processing device 20 is input to the voice recognition engine 40. The voice recognition engine 40 recognizes the audio included in the output signal from at least one audio processing device 20 and outputs a voice recognition result. The voice recognition engine 40 generates a voice recognition result and a signal based on the voice recognition result. The signal based on the voice recognition result is, for example, an operation signal of the electronic device 50. The voice recognition result by the voice recognition engine 40 is input to the electronic device 50. The voice recognition engine 40 may be a device different from the audio processing device 20. The voice recognition engine 40 is disposed inside a dashboard, for example. The voice recognition engine 40 may be accommodated and disposed inside the seat. Alternatively, the voice recognition engine 40 may be an integrated device incorporated into the audio processing device 20.

A signal output from the voice recognition engine 40 is input to the electronic device 50. The electronic device 50 performs, for example, an operation corresponding to the operation signal. The electronic device 50 is disposed, for example, on a dashboard of the vehicle 10. The electronic device 50 is, for example, a car navigation device. The electronic device 50 may be a panel meter, a television, or a mobile terminal.

FIG. 1 illustrates a case where four people are on the vehicle, but the number of passengers is not limited to this. The number of passengers may be equal to or less than the maximum riding capacity of the vehicle. For example, in a case where the maximum riding capacity of the vehicle is six, the number of passengers may be six or five or less.

The audio processing device 21, the audio processing device 22, the audio processing device 23, and the audio processing device 24 have similar configurations and functions except for the configuration of a part of the filter unit described later. Here, the audio processing device 21 will be described. The audio processing device 21 sets the audio uttered by the driver hm1 as a target component. Here, setting an audio as a target component is synonymous with setting an audio as an audio signal for acquisition. The audio processing device 21 outputs, as an output signal, an audio signal obtained by suppressing a crosstalk component from the audio signal collected by the microphone MC1. Here, the crosstalk component is a noise component including an audio of an occupant other than the occupant who utters the audio set as the target component.

As illustrated in FIG. 2, the audio processing device 21 includes an audio input module 29, a noise detection module 30, a filter unit F1 including a plurality of adaptive filters, a control module 28 that controls filter coefficients of the plurality of adaptive filters, and an addition module 27.

An audio signal of the audio collected by the microphone MC1, the microphone MC2, the microphone MC3, and the microphone MC4 is input to the audio input module 29. In other words, each of the microphone MC1, the microphone MC2, the microphone MC3, and the microphone MC4 outputs a signal based on an audio signal of the collected audio to the audio input module 29. The microphone MC1 outputs an audio signal A to the audio input module 29. The audio signal A is a signal including the audio of the driver hm1 and noise including the audio of an occupant other than the driver hm1. Here, in the audio processing device 21, the audio of the driver hm1 is a target component, and the noise including the audio of the occupant other than the driver hm1 is a crosstalk component. The microphone MC1 corresponds to the first microphone. The audio collected by the microphone MC1 corresponds to the first audio signal. The audio of the driver hm1 corresponds to the first audio component. The audio of the occupant other than the driver hm1 corresponds to the second audio component. The audio signal A corresponds to the first signal. The microphone MC2 outputs an audio signal B to the audio input module 29. The audio signal B is a signal including the audio of the occupant hm2 and noise including the audio of an occupant other than the occupant hm2. The microphone MC3 outputs an audio signal C to the audio input module 29. The audio signal C is a signal including the audio of the occupant hm3 and noise including the audio of an occupant other than the occupant hm3. The microphone MC4 outputs an audio signal D to the audio input module 29. The audio signal D is a signal including the audio of the occupant hm4 and noise including the audio of an occupant other than the occupant hm4. The microphone MC2, the microphone MC3, and the microphone MC4 correspond to the second microphone. The audio collected by the microphone MC2, the microphone MC3, and the microphone MC4 corresponds to the second audio signal. The audio signal B, the audio signal C, and the audio signal D correspond to the second signal. The audio input module 29 outputs the audio signal A, the audio signal B, the audio signal C, and the audio signal D. The audio input module 29 corresponds to a receiving unit.

In the present embodiment, the audio processing device 21 includes one audio input module 29 to which audio signals from all the microphones are input, but may include the audio input module 29 to which a corresponding audio signal is input for each microphone. For example, the configuration may be such that an audio signal of the audio collected by the microphone MC1 is input to an audio input module corresponding to the microphone MC1, an audio signal of the audio collected by the microphone MC2 is input to another audio input module corresponding to the microphone MC2, an audio signal of the audio collected by the microphone MC3 is input to another audio input module corresponding to the microphone MC3, and an audio signal of the audio collected by the microphone MC4 is input to another audio input module corresponding to the microphone MC4.

The audio signal A, the audio signal B, the audio signal C, and the audio signal D output from the audio input module 29 are input to the noise detection module 30. The noise detection module 30 determines whether or not each audio signal includes uncorrelated noise. The uncorrelated noise is noise having no correlation between audio signals. The uncorrelated noise is, for example, noise due to wind, noise due to a circuit, or touch noise due to contact with a microphone. The uncorrelated noise is also referred to as non-acoustic noise. For example, in a case where the intensity of a certain audio signal is equal to or larger than a predetermined value, the noise detection module 30 determines that the audio signal includes uncorrelated noise. Alternatively, the noise detection module 30 may compare the intensity of a certain audio signal with the intensity of another audio signal, and determine that the audio signal includes uncorrelated noise in a case where the intensity of the certain audio signal is larger than the intensity of the other audio signal by a predetermined value or more. In addition, the noise detection module 30 may determine that a certain audio signal includes uncorrelated noise based on the vehicle information. For example, the noise detection module 30 may receive, as the vehicle information, information on the vehicle speed and the open/closed state of the window, and determine that the audio signal C and the audio signal D include uncorrelated noise in a case where the vehicle speed is equal to or higher than a certain value and the window at the rear seat is open. The noise detection module 30 outputs the determination result as to whether or not each audio signal includes uncorrelated noise to the control module 28. The noise detection module 30 outputs the determination result as to whether or not each audio signal includes uncorrelated noise to the control module 28 as, for example, a flag. The flag indicates a value "1" or "0" for each audio signal. "1" means that the audio signal includes uncorrelated noise, and "0" means that the audio signal does not include uncorrelated noise. For example, in a case where it is determined that the audio signal A and the audio signal B do not include uncorrelated noise and the audio signal C and the audio signal D include uncorrelated noise, the noise detection module 30 outputs a flag "0, 0, 1, 1" to the control module 28 as a determination result. After determining whether the uncorrelated noise is included, the noise detection module 30 outputs the audio signal A to the addition module 27, and outputs the audio signal B, the audio signal C, and the audio signal D to the filter unit F1. Here, the noise detection module 30 corresponds to the determination module.

In the present embodiment, the audio processing device 21 includes one noise detection module 30 to which all the audio signals are input, but may include the noise detection module 30 to which the corresponding audio signal is input for each audio signal. For example, the audio signal A may be input to a noise detection module 301, the audio signal B may be input to a noise detection module 302, the audio signal C may be input to a noise detection module 303, and the audio signal D may be input to a noise detection module 304.

The filter unit F1 includes an adaptive filter F1A, an adaptive filter F1B, and an adaptive filter F1C. The adaptive filter is a filter having a function of changing characteristics in a process of signal processing. The filter unit F1 is used for a processing of suppressing a crosstalk component other than the audio of the driver hm1 included in the audio collected by the microphone MC1. In the present embodiment, the filter unit F1 includes three adaptive filters, but the number of adaptive filters is appropriately set based on the number of audio signals input and the processing amount of the crosstalk suppression processing. The process of suppressing crosstalk will be described later in detail. Here, the filter unit F1 corresponds to a first filter unit.

The audio signal B is input to the adaptive filter F1A as a reference signal. The adaptive filter F1A outputs a passing signal PB based on a filter coefficient CB and the audio signal B. The audio signal C is input to the adaptive filter F1B as a reference signal. The adaptive filter F1B outputs a passing signal PC based on a filter coefficient CC and the audio signal C. The audio signal D is input to the adaptive filter F1C as a reference signal. The adaptive filter F1C outputs a passing signal PD based on a filter coefficient CD and the audio signal D. The filter unit F1 adds and outputs the passing signal PB, the passing signal PC, and the passing signal PD. In the present embodiment, the adaptive filter F1A, the adaptive filter F1B, and the adaptive filter F1C are realized by a processor executing a program stored in a memory. The adaptive filter F1A, the adaptive filter F1B, and the adaptive filter F1C may have separate hardware configurations that are physically separated.

Here, an outline of the operation of the adaptive filter will be described. The adaptive filter is a filter used for suppressing a crosstalk component. For example, in a case where a least mean square (LMS) is used as an update algorithm of the filter coefficient, the adaptive filter is a filter that minimizes a cost function defined by a mean square of the error signal. The error signal here is a difference between the output signal and the target component.

Here, a finite impulse response (FIR) filter is exemplified as the adaptive filter. Other types of adaptive filters may be used. For example, an infinite impulse response (IIR) filter may be used.

In a case where the audio processing device 21 uses one FIR filter as the adaptive filter, the error signal that is the difference between the output signal of the audio processing device 21 and the target component is expressed by the following Formula (1).

$$e(n) = d(n) - \Sigma_{i=1}^{l-1} w_i x(n-i) \qquad (1)$$

Here, n is time, e(n) is an error signal, d(n) is a target component, wi is a filter coefficient, x(n) is a reference signal, and l is a tap length. As the tap length l is larger, the adaptive filter can faithfully reproduce the acoustic characteristics of the audio signal. In a case where there is no reverberation, the tap length l may be 1. For example, the tap length l is set to a constant value. For example, in a case where the target component is the audio of the driver hm1, the reference signal x(n) is the audio signal B, the audio signal C, and the audio signal D.

The addition module 27 generates an output signal by subtracting the subtraction signal from the target audio signal output from the audio input module 29. In the present embodiment, the subtraction signal is a signal obtained by adding the passing signal PB, the passing signal PC, and the passing signal PD output from the filter unit F1. The addition module 27 outputs the output signal to the control module 28.

The control module 28 outputs the output signal output from the addition module 27. The output signal of the control module 28 is input to the voice recognition engine 40. Alternatively, the output signal may be directly input from the control module 28 to the electronic device 50. In a case where an output signal is directly input from the control module 28 to the electronic device 50, the control module 28 and the electronic device 50 may be connected by wire or wirelessly. For example, the electronic device 50 may be a mobile terminal, and an output signal may be directly input from the control module 28 to the mobile terminal via a wireless communication network. The output signal input to the mobile terminal may be output as an audio from a speaker of the mobile terminal.

In addition, the control module 28 refers to the output signal output from the addition module 27 and the flag as the determination result output from the noise detection module 30 and updates the filter coefficient of each adaptive filter.

First, the control module 28 determines an adaptive filter to be the update target of the filter coefficient based on the determination result. Specifically, the control module 28 sets the adaptive filter to which the audio signal determined to be not including uncorrelated noise in the noise detection module 30 is input as the update target of the filter coefficient. In addition, the control module 28 does not set the adaptive filter to which the audio signal determined to be including uncorrelated noise in the noise detection module 30 is input as the update target of the filter coefficient. For example, in a case where a flag "0, 0, 1, 1" is received from the noise detection module 30, the control module 28 determines that the audio signal A and the audio signal B do not include uncorrelated noise and the audio signal C and the audio signal D include uncorrelated noise. Then, the control module 28 sets the adaptive filter F1A as the update target of the filter coefficient, and does not set the adaptive filter F1B and the adaptive filter F1C as update targets of the filter coefficient. In this case, the adaptive filter F1A corresponds to a second adaptive filter, and the adaptive filter F1B and the adaptive filter F1C correspond to a first adaptive filter.

Then, the control module 28 updates the filter coefficient in a manner that the value of the error signal in Formula (1) approaches 0 for the adaptive filter set as the update target of the filter coefficient.

The update of the filter coefficient in a case where the LMS is used as the update algorithm will be described. In a case where a filter coefficient w(n) at the time n is updated to be a filter coefficient w(n+1) at a time n+1, the relationship between w(n+1) and w(n) is expressed by the following Formula (2).

$$w(n+1) = w(n) - \alpha x(n) e(n) \qquad (2)$$

Here, α is a correction coefficient of the filter coefficient. A term αx(n)e(n) corresponds to the update amount.

Note that the algorithm at the time of updating the filter coefficient is not limited to the LMS, and other algorithms may be used. For example, an algorithm such as independent component analysis (ICA) or a normalized least mean square (NLMS) may be used.

At the time of updating the filter coefficient, the control module 28 sets the intensity of the reference signal input to zero for the adaptive filter that has not been set as the update target of the filter coefficient. For example, when a flag "0, 0, 1, 1" is received from the noise detection module 30, the control module 28 sets the audio signal B input to the adaptive filter F1A as the reference signal input with the intensity output from the noise detection module 30 as it is, and sets the intensities of the audio signal C input to the adaptive filter F1B as the reference signal and the audio signal D input to the adaptive filter F1C as the reference signal to zero. Here, "setting the intensity of the reference signal input to the adaptive filter to zero" includes suppressing the intensity of the reference signal input to the adaptive filter to near zero. In addition, "setting the intensity of the reference signal input to the adaptive filter to zero" includes setting the reference signal not to be input to the adaptive filter. In a case where the intensity of the audio signal input as the reference signal is not set to zero, the audio signal including uncorrelated noise is input to the adaptive filter that has not been set as the update target of the filter coefficient. For example, when an audio signal including a large volume of wind noise as uncorrelated noise is used as a reference signal, it may be difficult to accurately obtain a target component. Setting the intensity input to the adaptive filter to zero for an audio signal including uncorrelated noise is equivalent to not using this signal as a reference signal. As a result, even when the crosstalk component includes uncorrelated noise, the target component can be accurately obtained. In the adaptive filter in which the intensity of the reference signal input is set to zero, the adaptive filtering may not be performed. As a result, the processing amount of the crosstalk suppression processing using the adaptive filter can be reduced.

Then, the control module 28 updates the filter coefficient only for the adaptive filter set as the update target of the filter coefficient, and does not update the filter coefficient for the adaptive filter not set as the update target of the filter coefficient. As a result, the processing amount of the crosstalk suppression processing using the adaptive filter can be reduced.

For example, a case where the target seat is the driver's seat and there is no utterance by the driver hm1 and there are utterances by the occupant hm2, the occupant hm3, and the occupant hm4 is considered. At this time, the utterance of the occupant other than the driver hm1 leaks into the audio signal of the audio collected by the microphone MC1. In other words, the audio signal A includes the crosstalk component. The audio processing device 21 may cancel the crosstalk component and update the adaptive filter to minimize the error signal. In this case, since there is no utterance at the driver's seat, the error signal ideally becomes a silent signal. In addition, in the above case, in a case where there is an utterance by the driver hm1, the utterance by the driver hm1 leaks into a microphone other than the microphone MC1. Also in this case, the utterance by the driver hm1 is not canceled by the processing by the audio processing device 21. This is because the utterance by driver hm1 included in audio signal A is temporally earlier than the utterance by driver hm1 included in the other audio signals. This depends on the law of causality. Therefore, the audio processing device 21 can reduce the crosstalk component included in the audio signal A by updating the adaptive filter to minimize the error signal regardless of whether the audio signal of the target component is included or not.

In the present embodiment, the functions of the audio input module 29, the noise detection module 30, the filter unit F1, the control module 28, and the addition module 27 are realized by a processor executing a program stored in a memory. Alternatively, the audio input module 29, the noise detection module 30, the filter unit F1, the control module 28, and the addition module 27 may be configured by separate hardware.

Although the audio processing device 21 has been described, the audio processing device 22, the audio processing device 23, and the audio processing device 24 also have substantially similar configurations except for the filter unit. The audio processing device 22 sets the audio uttered by the occupant hm2 as a target component. The audio processing device 22 outputs, as an output signal, an audio signal obtained by suppressing a crosstalk component from the audio signal collected by the microphone MC2. Therefore, the audio processing device 22 is different from the audio processing device 21 in that it includes the filter unit to which the audio signal A, the audio signal C, and the audio signal D are input. Similarly, the audio processing device 23 sets the audio uttered by the occupant hm3 as a target component. The audio processing device 23 outputs, as an output signal, an audio signal obtained by suppressing a crosstalk component from the audio signal collected by the microphone MC3. Therefore, the audio processing device 23 is different from the audio processing device 21 in that it includes the filter unit to which the audio signal A, the audio signal B, and the audio signal D are input. The audio processing device 24 sets the audio uttered by the occupant hm4 as a target component. The audio processing device 24 outputs, as an output signal, an audio signal obtained by suppressing a crosstalk component from the audio signal collected by the microphone MC4. Therefore, the audio processing device 24 is different from the audio processing device 21 in that it includes the filter unit to which the audio signal A, the audio signal B, and the audio signal C are input.

FIG. 3 is a flowchart illustrating an operation procedure of the audio processing device 21. First, the audio signal A, the audio signal B, the audio signal C, and the audio signal D are input to the audio input module 29 (S1). Next, the noise detection module 30 determines whether each audio signal includes uncorrelated noise (S2). The noise detection module 30 outputs this determination result as a flag to the control module 28. In a case where none of the audio signals includes uncorrelated noise, the filter unit F1 generates a subtraction signal as follows (S3). The adaptive filter F1A passes the audio signal B and outputs the passing signal PB. The adaptive filter F1B passes audio signal C and outputs the passing signal PC. The adaptive filter F1C passes audio signal D and outputs the passing signal PD. The filter unit F1 adds the passing signal PB, the passing signal PC, and the passing signal PD, and outputs it as a subtraction signal. The addition module 27 subtracts the subtraction signal from the audio signal A, and generates and outputs an output signal (S4). The output signal is input to the control module 28 and output from the control module 28. Next, the control module 28 refers to the flag as the determination result output from the noise detection module 30, and updates the filter coefficients of the adaptive filter F1A, the adaptive filter F1B, and the adaptive filter F1C based on the output signal in a manner that the target component included in the output signal is maximized (S5). Then, the audio processing device 21 performs Step S1 again.

In a case where it is determined in Step S2 that any of the audio signals includes uncorrelated noise, the noise detection module 30 determines whether or not the audio signal including uncorrelated noise is a target component (S6). Specifically, it is determined whether the audio signal including uncorrelated noise is the audio signal A. In a case where the audio signal including uncorrelated noise is the target component, the control module 28 sets the intensity of audio signal A to zero, and outputs audio signal A as the output signal (S7). At this time, the control module 28 does not update the filter coefficients of the adaptive filter F1A, the adaptive filter F1B, and the adaptive filter F1C. Then, the audio processing device 21 performs Step S1 again.

In Step S6, in a case where the audio signal including uncorrelated noise is not the target component, the control module 28 sets the intensity of the audio signal including uncorrelated noise input to the filter unit F1 to zero. For example, a case where the audio signal C and the audio signal D include uncorrelated noise and the audio signal B does not include uncorrelated noise is considered. In this case, the control module 28 sets the intensities of the audio signal C and the audio signal D input to the filter unit F1 to zero, and does not change the intensity of the audio signal B. Then, the filter unit F1 generates a subtraction signal by an operation similar to that in Step S3 (S8). Similarly to Step S4, the addition module 27 subtracts the subtraction signal from the audio signal A, and generates and outputs an output signal (S9). Next, based on the output signal, the control module 28 updates the filter coefficient of the adaptive filter to which the signal not including uncorrelated noise is input in a manner that the target component included in the output signal is maximized (S10). For example, a case where the audio signal C and the audio signal D include uncorrelated noise and the audio signal B does not include uncorrelated noise is considered. In this case, the control module 28 updates the filter coefficient of the adaptive filter F1A, and does not update the filter coefficients of the adaptive filter F1B and the adaptive filter F1C. Then, the audio processing device 21 performs Step S1 again.

As described above, in the audio processing system 5 according to the first embodiment, a plurality of audio signals is acquired by a plurality of microphones, and a subtraction signal generated using an adaptive filter is subtracted from a certain audio signal by using another audio signal as a reference signal. Thus, the audio of a specific speaker is obtained with high accuracy. In the first embodiment, when a subtraction signal is generated using the adaptive filter, the intensity of the audio signal including uncorrelated noise input to the adaptive filter is set to zero. For example, there is a case where wind blows into the rear seat and a large volume of wind noise is collected in a microphone near the rear seat. At this time, when the audio signal obtained at the rear seat is used as the reference signal, it may be difficult to obtain the audio of a specific speaker. On the other hand, in the present embodiment, in order to make the intensity of the audio signal including uncorrelated noise input to the adaptive filter zero, the audio signal of the target component can be accurately obtained even when the uncorrelated noise occurs at a seat other than the target seat. In addition, in the first embodiment, the filter coefficient is not updated for the adaptive filter to which the audio signal including uncorrelated noise is input. As a result, the amount of processing for canceling the crosstalk component can be reduced.

Note that, in a case where each microphone is a microphone array, the microphone array may have directivity toward a corresponding occupant at the time of collecting audio, and may acquire the audio, that is, perform beamforming. As a result, the S/N ratio of the audio signal input to each microphone is improved. Thus, the accuracy of the crosstalk component suppression processing performed by the audio processing system 5 can be improved.

Figure 4A:
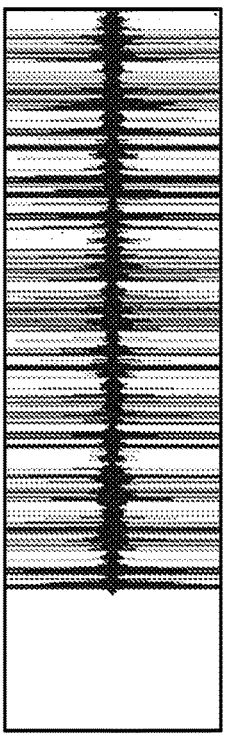
FIGS. 4A to 4H are diagrams illustrating an output result of the audio processing device.
Figure 4B:
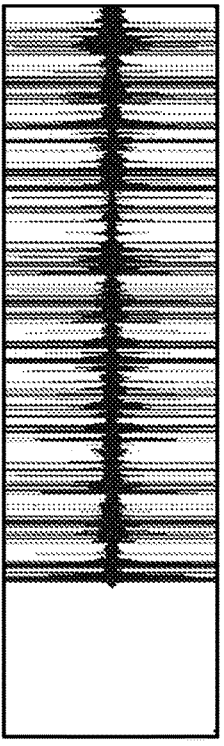
Figure 4C:
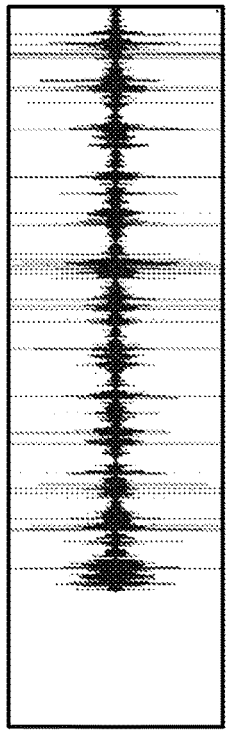
Figure 4D:
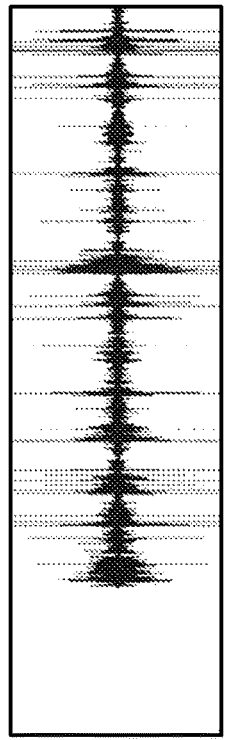
Figure 4E:
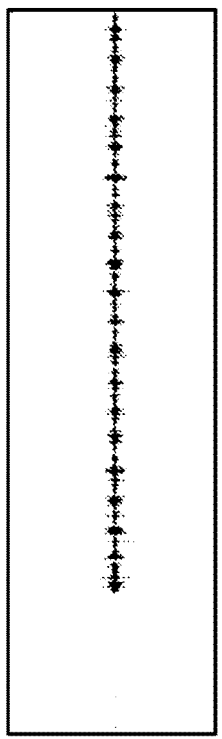
Figure 4F:
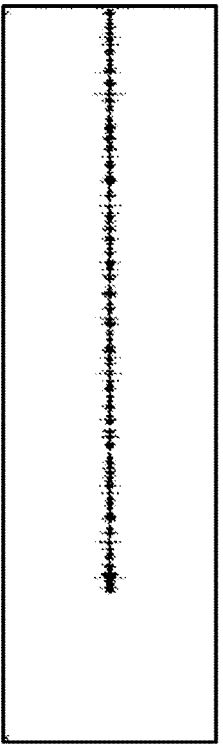

FIGS. 4A to 4H illustrate an output result of the audio processing device 20. FIGS. 4A to 4H illustrate output results of the audio processing devices 20 when a large volume wind noise is collected by the microphone MC3 and the microphone MC4 in a state where there are utterances by the driver hm1, the occupant hm2, the occupant hm3, and the occupant hm4. FIGS. 4A to 4D illustrate output results of the audio processing devices 20 when the input intensities of the audio signal C and the audio signal D are not set to zero and the update of the adaptive filter F1B and the adaptive filter F1C is not stopped. FIG. 4A corresponds to the output result of the audio processing device 21, FIG. 4B corresponds to the output result of the audio processing device 22, FIG. 4C corresponds to the output result of the audio processing device 23, and FIG. 4D corresponds to the output result of the audio processing device 24. FIGS. 4E to 4H illustrate output results of the audio processing devices 20 when the input intensities of the audio signal C and the audio signal D are set to zero and the update of the adaptive filter F1B and the adaptive filter F1C is stopped. FIG. 4E corresponds to the output result of the audio processing device 21, FIG. 4F corresponds to the output result of the audio processing device 22, FIG. 4G corresponds to the output result of the audio processing device 23, and FIG. 4H corresponds to the output result of the audio processing device 24.

Figure 4G:
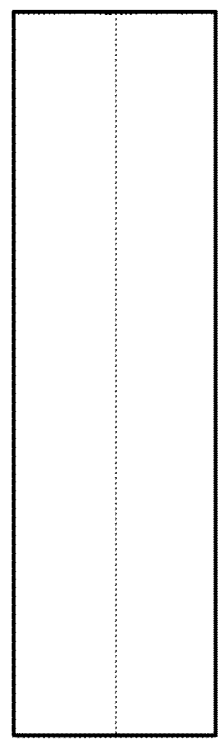
Figure 4H:

From FIGS. 4A to 4D, by using the audio signal including uncorrelated noise as the reference signal, the output signals of the audio processing device 21 and the audio processing device 22 are signals including a very large amount of noise. In this case, even if the output signals of the audio processing device 21 and the audio processing device 22 are used for voice recognition, the recognition accuracy is considered to be low. On the other hand, it can be seen that the output signals of the audio processing device 21 and the audio processing device 22 illustrated in FIGS. 4E and 4F include less noise than those illustrated in FIGS. 4A and 4B. Therefore, in this case, the output signals of the audio processing device 21 and the audio processing device 22 can be audio recognized with high accuracy. In addition, as illustrated in FIGS. 4G and 4H, the intensities of the output signals of the audio processing device 23 and the audio processing device 24 are zero.

Second Embodiment

FIG. 5 is a diagram illustrating an example of a schematic configuration of an audio processing system 5A according to a second embodiment. The audio processing system 5A according to the second embodiment is different from the audio processing system 5 according to the first embodiment in that an audio processing device 20A is provided instead of the audio processing device 20. The audio processing device 20A according to the second embodiment is different from the audio processing device 20 according to the first embodiment in that an additional filter unit is included. In the present embodiment, the audio processing system 5A includes a plurality of audio processing devices 20A corresponding to the respective microphones. Specifically, the audio processing system 5A includes an audio processing device 21A, an audio processing device 22A, an audio processing device 23A, and an audio processing device 24A. Hereinafter, the audio processing device 20A will be described with reference to FIGS. 6 and 7. The same configurations and operations as those described in the first embodiment are denoted by the same reference numerals, and the description will be omitted or simplified.

FIG. 6 is a block diagram illustrating a configuration of the audio processing device 21A. The audio processing device 21A, the audio processing device 22A, the audio processing device 23A, and the audio processing device 24A have similar configurations and functions except for a part of a filter unit described later. Here, the audio processing device 21A will be described. The audio processing device 21A sets the audio uttered by the driver hm1 as a target. The audio processing device 21A outputs, as an output signal, an audio signal obtained by suppressing a crosstalk component from the audio signal collected by the microphone MC1.

The audio processing device 21A includes the audio input module 29, a noise detection module 30A, the filter unit F1 including a plurality of adaptive filters, a filter unit F2 including one or more adaptive filters, a control module 28A that controls a filter coefficient of the adaptive filter of the filter unit F1, and an addition module 27A.

The filter unit F2 includes one or more adaptive filters. In the present embodiment, the filter unit F2 includes an adaptive filter F2A. The filter unit F2 is used for a processing of suppressing a crosstalk component other than the audio of the driver hm1 included in the audio collected by the microphone MC1. The number of adaptive filters included in filter unit F2 is smaller than the number of adaptive filters included in filter unit F1. In the present embodiment, the filter unit F2 includes one adaptive filter, but the number of adaptive filters is appropriately set based on the number of audio signals input and the processing amount of the crosstalk suppression processing. The process of suppressing crosstalk will be described later in detail. Here, the filter unit F2 corresponds to a second filter unit.

The audio signal B is input to the adaptive filter F2A as a reference signal. The adaptive filter F2A outputs a passing signal PB2 based on a unique filter coefficient CB2 and the audio signal B. In the present embodiment, the function of the adaptive filter F2A is realized by software processing. The adaptive filter F2A may have a separate hardware configuration physically separated from each adaptive filter in the filter unit F1. Here, the adaptive filter F1A corresponds to the second adaptive filter, the adaptive filter F1B and the adaptive filter F1C correspond to the first adaptive filter, and the adaptive filter F2A corresponds to a third adaptive filter. In addition, the audio signal B corresponds to a third signal.

The adaptive filter F2A may be an FIR filter, an IIR filter, or another type of adaptive filter. It is desirable that the adaptive filter F2A is the same type of adaptive filter as the adaptive filter F1A, the adaptive filter F1B, and the adaptive filter F1C because the processing amount can be reduced as compared with the case of using different types of adaptive filters. Here, a case where an FIR filter is used as the adaptive filter F2A will be described.

The addition module 27A generates an output signal by subtracting the subtraction signal from the target audio signal output from the audio input module 29. In the present embodiment, the subtraction signal is a signal obtained by adding the passing signal PB, the passing signal PC, and the passing signal PD output from the filter unit F1, or the passing signal PB2 output from the filter unit F2. The addition module 27A outputs the output signal to the control module 28A.

The control module 28A outputs the output signal output from the addition module 27A. The output signal of the control module 28A is input to the voice recognition engine 40. Alternatively, the output signal may be directly input from the control module 28A to the electronic device 50. In a case where an output signal is directly input from the control module 28A to the electronic device 50, the control module 28A and the electronic device 50 may be connected by wire or wirelessly. For example, the electronic device 50 may be a mobile terminal, and an output signal may be directly input from the control module 28A to the mobile terminal via a wireless communication network. The output signal input to the mobile terminal may be output as an audio from a speaker of the mobile terminal.

In addition to the function of the noise detection module 30, the noise detection module 30A determines whether each audio signal includes an audio component by utterance. The noise detection module 30A outputs the determination result as to whether or not each audio signal includes an audio component by utterance to the control module 28. The noise detection module 30A outputs the determination result as to whether or not each audio signal includes an audio component by utterance to the control module 28 as, for example, a flag. The flag indicates a value "1" or "0" for each audio signal. "1" means that the audio signal includes an audio component by utterance, and "0" means that the audio signal does not include an audio component by utterance. For example, in a case where it is determined that the audio signal A and the audio signal B include an audio component by utterance and the audio signal C and the audio signal D do not include an audio component by utterance, the noise detection module 30 outputs a flag "1, 1, 0, 0" to the control module 28A as a determination result. Here, the audio component by utterance corresponds to a first component derived from the utterance. Then, the control module 28A determines which one of the filter unit F1 and the filter unit F2 is used to generate the subtraction signal based on the determination result detection unit as to whether each audio signal includes an audio component by utterance. For example, there is a case where an adaptive filter to which the audio signal determined to be not including the audio component by the utterance is input is included by the filter unit F1 and not included by the filter unit F2. In this case, the control module 28A determines to generate a subtraction signal using the filter unit F2. The audio processing device 21A may include an utterance determination module that determines whether each audio signal includes an audio component by utterance, separately from the noise detection module 30A. In this case, the utterance determination module is connected between the audio input module 29 and the noise detection module 30A or between the noise detection module 30A and the filter unit F1 and the filter unit F2. The function of the utterance determination module is realized, for example, by a processor executing a program stored in a memory. The function of the utterance determination module may be realized by hardware.

For example, a case is considered in which the audio signal B includes an audio component due to the utterance of the occupant hm2, the audio signal C does not include an audio component due to the utterance of the occupant hm3, and the audio signal D does not include an audio component due to the utterance of the occupant hm4. At that time, an adaptive filter to which audio signal C and audio signal D are input is included by the filter unit F1 and not included by the filter unit F2. The filter coefficient of each adaptive filter included in the filter unit F1 is updated to minimize the error signal, for example, in a case where the reference signal is input to each of all the adaptive filters. On the other hand, the filter coefficient of the adaptive filter F2A included in the filter unit F2 is a unique value on the assumption that only the audio signal B is used as the reference signal. Therefore, when a case where only the audio signal B is input to each filter unit as the reference signal is compared, there is a possibility that the error signal can be made smaller using the filter unit F2 than using the filter unit F1.

In a case where the number of adaptive filters included in the filter unit F2 is smaller than the number of adaptive filters included in the filter unit F1, the processing amount can be reduced by generating the subtraction signal using the filter unit F2 as compared with the case where a subtraction signal is generated using the filter unit F1.

Alternatively, in the noise detection module 30, an adaptive filter to which the audio signal determined to be including uncorrelated noise is input is included by the filter unit F1 and not included by the filter unit F2. Also in this case, the control module 28A determines to generate a subtraction signal using the filter unit F2.

The filter coefficient of each adaptive filter included in the filter unit F1 is updated to minimize the error signal, for example, in a case where the reference signal is input to each of all the adaptive filters. On the other hand, the filter coefficient of the adaptive filter F2A included in the filter unit F2 is a unique value on the assumption that only the audio signal B is used as the reference signal. In a case where the audio signal C and the audio signal D include uncorrelated noise, the intensities of the audio signal C and the audio signal D input to the filter unit F1 are set to zero. In this case, the error signal can be made smaller in some cases by using filter unit F2 that uses only the audio signal B as the reference signal rather than using filter unit F1 that assumes that all of the audio signal B, the audio signal C, and the audio signal D are used as the reference signal.

In addition, the control module 28A updates the filter coefficient of each adaptive filter of the filter unit F1 in a case where a subtraction signal is generated using the filter unit F1 based on the output signal output from the addition module 27A and the determination result output from the noise detection module 30. The method of updating the filter coefficient is similar to that of the first embodiment.

In the present embodiment, the functions of the audio input module 29, the noise detection module 30, the filter unit F1, the filter unit F2, the control module 28A, and the addition module 27A are realized by a processor executing a program stored in a memory. The audio input module 29, the noise detection module 30, the filter unit F1, the filter unit F2, the control module 28A, and the addition module 27A may be configured by separate hardware.

FIG. 7 is a flowchart illustrating an operation procedure of the audio processing device 21A. First, the audio signal A, the audio signal B, the audio signal C, and the audio signal D are input to the audio input module 29 (S11). Next, the noise detection module 30 determines whether each audio signal includes uncorrelated noise (S12). In a case where none of the audio signals includes uncorrelated noise, the control module 28A determines which filter unit is used to generate a subtraction signal (S13). In a case where the control module 28A determines to use the filter unit F1, the filter unit F1 generates and outputs a subtraction signal similarly to Step S3 of the first embodiment (S14). The addition module 27A subtracts the subtraction signal from the audio signal A, and generates and outputs an output signal (S15). The output signal is input to the control module 28 and output from the control module 28. Next, the control module 28 updates the filter coefficients of the adaptive filter F1A, the adaptive filter F1B, and the adaptive filter F1C based on the output signal in a manner that the target component included in the output signal is maximized (S16). Then, the audio processing device 21A performs Step S11 again.

In Step S13, in a case where the control module 28A determines to use the filter unit F2, the filter unit F2 generates a subtraction signal as follows (S17). The adaptive filter F2A passes the audio signal B, and outputs the passing signal PB2. The filter unit F2 outputs the passing signal PB2 as a subtraction signal. The addition module 27A subtracts the subtraction signal from the audio signal A, and generates and outputs an output signal (S18). The output signal is input to the control module 28 and output from the control module 28. Then, the audio processing device 21 performs Step S11 again.

In a case where it is determined in Step S2 that any of the audio signals includes uncorrelated noise, the noise detection module 30 determines whether or not the audio signal including uncorrelated noise is a target component (S19). Specifically, it is determined whether the audio signal including uncorrelated noise is the audio signal A. In a case where the audio signal including uncorrelated noise is the target component, the control module 28 sets the intensity of audio signal A to zero, and outputs audio signal A as the output signal (S20). At this time, the control module 28 does not update the filter coefficients of the adaptive filter F1A, the adaptive filter F1B, and the adaptive filter F1C. Then, the audio processing device 21A performs Step S11 again.

In Step S19, when the audio signal including uncorrelated noise is not the target component, the control module 28A determines which filter unit is used to generate a subtraction signal (S21). In a case where the control module 28A determines to use the filter unit F1, the control module 28 sets the intensity of the audio signal including uncorrelated noise input to the filter unit F1 to zero. For example, a case where the audio signal B includes uncorrelated noise, and the audio signal C and the audio signal D do not include uncorrelated noise is considered. In this case, the control module 28 sets the intensity of the audio signal B input to filter unit F1 to zero, and does not change the intensities of the audio signal C and the audio signal D. Then, the filter unit F1 generates a subtraction signal by an operation similar to that in Step S3 of the first embodiment (S22). Similarly to Step S4 of the first embodiment, the addition module 27A subtracts the subtraction signal from the audio signal A, and generates and outputs an output signal (S23). Next, based on the output signal, the control module 28A updates the filter coefficient of the adaptive filter to which the signal not including uncorrelated noise is input in a manner that the target component included in the output signal is maximized (S24). For example, a case where the audio signal B includes uncorrelated noise, and the audio signal C and the audio signal D do not include uncorrelated noise is considered. In this case, the control module 28 updates the filter coefficients of the adaptive filter F1B and the adaptive filter F1C, and does not update the filter coefficient of the adaptive filter F1A. Then, the audio processing device 21A performs Step S11 again.

In Step S21, in a case where the control module 28A determines to use the filter unit F2, the filter unit F2 generates a subtraction signal similarly to Step S17 (S25). The addition module 27A subtracts the subtraction signal from the audio signal A, and generates and outputs an output signal (S26). The output signal is input to the control module 28 and output from the control module 28. Then, the audio processing device 21A performs Step S11 again.

As described above, also in the audio processing system 5A according to the second embodiment, the audio signal of the target component can be accurately obtained even when uncorrelated noise occurs at a seat other than the target seat, similarly to the audio processing system 5. In addition, in the first embodiment, the filter coefficient is not updated for the adaptive filter to which the audio signal including uncorrelated noise is input. As a result, the amount of processing for canceling the crosstalk component can be reduced.

In addition, the audio processing system 5A includes the additional filter unit F2 having a smaller number of adaptive filters than the filter unit F1, and the control module 28A determines which one of the filter unit F1 and the filter unit F2 is to be used. As a result, the processing amount can be made smaller as compared with a case where the subtraction signal is always generated using the filter unit F1.

In the present embodiment, the case where the filter unit F2 includes one adaptive filter having a unique filter coefficient has been described, but the filter unit F2 may include two or more adaptive filters. In addition, the coefficient of the adaptive filter included in the filter unit F2 may not be unique and may be controllable by the control module 28A. In a case where the filter unit F2 includes an adaptive filter capable of controlling the filter coefficient, the control module 28A may update the filter coefficient of the adaptive filter to which the audio signal not including uncorrelated noise is input, after Step S18 or after Step S26.

Note that these comprehensive or specific aspects may be realized by a system, a method, an integrated circuit, a computer program, or a recording medium, or may be realized by any combination of a system, a device, a method, an integrated circuit, a computer program, and a recording medium.

According to one aspect of the present disclosure, there is provided an audio processing system capable of obtaining a target audio with high accuracy even when surrounding audio includes uncorrelated noise.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An audio processing system comprising:
   a first microphone configured to acquire a first audio signal including a first audio component and output a first signal based on the first audio signal;

one or more microphones configured to acquire respective audio signals including respective audio components different from the first audio component and output respective microphone signals based on the respective audio signals;

one or more adaptive filters configured to respectively receive the respective microphone signals from the one or more microphones and output respective passing signals based on the respective microphone signals; and a processor configured to:
  determine whether each of the respective microphone signals includes uncorrelated noise;
  control one or more filter coefficients of the one or more adaptive filters; and
  subtract a subtraction signal from the first signal, the subtraction signal being determined based on the respective passing signals, wherein the one or more microphones include a second microphone configured to acquire a second audio signal including a second audio component different from the first audio component and output a second signal based on the second audio signal, and in case the second signal is determined to include the uncorrelated noise, the processor is configured to set a level of the second signal that is input to a corresponding adaptive filter to zero.

2. The audio processing system according to claim 1, wherein
the one or more microphones include a third microphone configured to acquire a third audio signal including a third audio component different from the first audio component and the second audio component, and output a third signal based on the third audio signal,
the one or more adaptive filters include a first adaptive filter to which the second signal is input and a second adaptive filter to which the third signal is input, and
in case the second signal is determined to include the uncorrelated noise and the third signal is determined to not include the uncorrelated noise, the processor is configured to change a filter coefficient of the second adaptive filter without changing a filter coefficient of the first adaptive filter.

3. The audio processing system according to claim 2, wherein
the processor is configured to determine that a microphone signal of the respective microphone signals includes the uncorrelated noise when an intensity of the microphone signal of the respective microphone signals is equal to or larger than a predetermined value.

4. The audio processing system according to claim 2, wherein
the one or more microphones include a first target microphone configured to output a first microphone signal and a second target microphone configured to output a second microphone signal, the second target microphone being different from the first target microphone, and
the processor is configured to determine that the first microphone signal includes the uncorrelated noise when an intensity of the first microphone signal is larger than an intensity of the second microphone signal by a predetermined value or more.

5. The audio processing system according to claim 2, wherein
the processor is configured to determine that a microphone signal of the respective microphone signals includes the uncorrelated noise based on vehicle information.

6. The audio processing system according to claim 1, wherein
the one or more microphones includes a third microphone configured to acquire a third audio signal including a third audio component different from the first audio component and the second audio component, and output a third signal based on the third audio signal,
the audio processing system further comprises:
  a first filter unit including the one or more adaptive filters, the one or more adaptive filters including a first adaptive filter to which the second signal is input and a second adaptive filter to which the third signal is input; and
  a second filter unit including one or more adaptive filters, the second filter unit including a third adaptive filter, which is different from the second adaptive filter, configured to receive the third signal and output a first passing signal based on the third signal,
a number of the one or more adaptive filters included in the second filter unit is smaller than a number of the one or more adaptive filters included in the first filter unit, and
the processor is configured to determine which of the first filter unit and the second filter unit is used to generate the subtraction signal based on the second signal and the third signal.

7. The audio processing system according to claim 6, wherein
the second filter unit includes only the third adaptive filter, and
in case the second signal is determined to not include a first component derived from utterance and the third signal is determined to include the first component, the processor is configured to generate the subtraction signal by using the second filter unit.

8. The audio processing system according to claim 1, wherein
the processor is configured to determine that a microphone signal of the respective microphone signals includes the uncorrelated noise when an intensity of the microphone signal of the respective microphone signals is equal to or larger than a predetermined value.

9. The audio processing system according to claim 1, wherein
the one or more microphones include a first target microphone configured to output a first microphone signal and a second target microphone configured to output a second microphone signal, the second target microphone being different from the first target microphone, and
the processor is configured to determine that the first microphone signal includes the uncorrelated noise when an intensity of the first microphone signal is larger than an intensity of the second microphone signal by a predetermined value or more.

10. The audio processing system according to claim 1, wherein
the processor is configured to determine that a microphone signal of the respective microphone signals includes the uncorrelated noise based on vehicle information.

11. An audio processing device comprising:
a first receiver configured to receive a first signal based on a first audio signal including a first audio component;
one or more receivers configured to receive respective microphone signals based on respective audio signals including respective audio components different from the first audio component;
one or more adaptive filters configured to respectively receive the respective microphone signals from the one or more receivers and output respective passing signals based on the respective microphone signals; and
a processor configured to:
determine whether each of the respective microphone signals includes uncorrelated noise;
control one or more filter coefficients of the one or more adaptive filters; and
subtract a subtraction signal from the first signal, the subtraction signal being determined based on the respective passing signals, wherein
the one or more receivers include a second receiver configured to receive a second signal based on a second audio signal including a second audio component different from the first audio component, and
in case the second signal is determined to include the uncorrelated noise, the processor is configured to set a level of the second signal that is input to a corresponding adaptive filter to zero.

12. The audio processing device according to claim 11, wherein
the one or more receivers are configured to receive a third signal based on a third audio signal including a third audio component different from the first audio component and the second audio component,
the one or more adaptive filters include a first adaptive filter to which the second signal is input and a second adaptive filter to which the third signal is input, and
in case the second signal is determined to include the uncorrelated noise and the third signal is determined to not include the uncorrelated noise, the processor is configured to change a filter coefficient of the second adaptive filter without changing a filter coefficient of the first adaptive filter.

13. The audio processing device according to claim 12, wherein
the processor is configured to determine that a microphone signal of the respective microphone signals includes the uncorrelated noise when an intensity of the microphone signal of the respective microphone signals is equal to or larger than a predetermined value.

14. The audio processing device according to claim 12, wherein
the respective microphone signals includes a first microphone signal and a second microphone signal different from the first microphone signal, and
the processor is configured to determine that the first microphone signal includes the uncorrelated noise when an intensity of the first microphone signal is larger than an intensity of the second microphone signal by a predetermined value or more.

15. The audio processing device according to claim 12, wherein
the processor is configured to determine that a microphone signal of the respective microphone signals includes the uncorrelated noise based on vehicle information.

16. The audio processing device according to claim 11, wherein
the one or more receivers are configured to receive a third signal based on a third audio signal including a third audio component different from the first audio component and the second audio component,
the audio processing device further comprises:
a first filter unit including the one or more adaptive filters, the one or more adaptive filters including a first adaptive filter to which the second signal is input and a second adaptive filter to which the third signal is input; and
a second filter unit including one or more adaptive filters, the second filter unit including a third adaptive filter, which is different from the second adaptive filter, configured to receive the third signal and output a first passing signal based on the third signal,
a number of the one or more adaptive filters included in the second filter unit is smaller than a number of the one or more adaptive filters included in the first filter unit, and
the processor is configured to determine which of the first filter unit and the second filter unit is used to generate the subtraction signal based on the second signal and the third signal.

17. The audio processing device according to claim 16, wherein
the second filter unit includes only the third adaptive filter, and
in case the second signal is determined to not include a first component derived from utterance and the third signal is determined to include the first component, the processor is configured to generate the subtraction signal by using the second filter unit.

18. The audio processing device according to claim 11, wherein
the processor is configured to determine that a microphone signal of the respective microphone signals includes the uncorrelated noise when an intensity of the microphone signal of the respective microphone signals is equal to or larger than a predetermined value.

19. The audio processing device according to claim 11, wherein
the respective microphone signals includes a first microphone signal and a second microphone signal different from the first microphone signal, and
the processor is configured to determine that the first microphone signal includes the uncorrelated noise when an intensity of the first microphone signal is larger than an intensity of the second microphone signal by a predetermined value or more.

20. The audio processing device according to claim 11, wherein
the processor is configured to determine that a microphone signal of the respective microphone signals includes the uncorrelated noise based on vehicle information.

* * * * *